United States Patent [19]
Maruyama et al.

[11] Patent Number: 5,820,961
[45] Date of Patent: Oct. 13, 1998

[54] LAMINATED OPTICAL DISCS

[75] Inventors: Haruhisa Maruyama; Shinichi Hanzawa; Masaaki Motokawa, all of Yamanashi, Japan

[73] Assignees: Pioneer Electronic Corporation, Tokyo; Pioneer Video Corporation, Yamanashi, both of Japan

[21] Appl. No.: 763,317

[22] Filed: Dec. 10, 1996

[30] Foreign Application Priority Data

Dec. 22, 1995 [JP] Japan ..................................... 7-350108

[51] Int. Cl.⁶ ....................................................... B32B 3/00
[52] U.S. Cl. ...................... 428/64.1; 428/64.2; 428/64.4; 428/64.7; 428/65.2; 428/913; 430/495.1; 430/523; 430/945; 369/283
[58] Field of Search ................................... 428/64.1, 64.2, 428/64.4, 64.7, 65.2, 913; 430/495.1, 523, 531, 945.1; 369/283, 288

[56] References Cited

U.S. PATENT DOCUMENTS 5,573,831  11/1996  Suzuki et al. ........................... 428/64.1
5,616,450   4/1997  Arai et al. ................................ 430/321

*Primary Examiner*—Elizabeth Evans
*Attorney, Agent, or Firm*—Morgan, Lewis & Bockius LLP

[57] ABSTRACT

In order to provide a laminated optical disc having a sufficient display portion and a reliable print display, a pair of disc substrates are bonded together to form an optical disc, in which one disc substrate is colored and contents of recorded matters are displayed on the surface thereof so as to eliminate the ground solid print layer for the print display layer and to avoid deformation or warping of the disc.

4 Claims, 3 Drawing Sheets

LAMINATED OPTICAL DISCS

BACKGROUND OF THE INVENTION

1. Technical Field

The present invention relates to a laminated optical disc having an improved display referring to the contents of matters recorded in it.

2. Background Art

So-called video discs, compact discs, etc. have been conventionally known as reproducible optical discs.

FIG. 1 shows a cross-sectional view of a laminated optical disc.

In FIG. 1, a light-transmitting disc substrate 11 molded out of a synthetic resin has on one side a signal surface having pits carrying information formed thereon, and a reflecting layer 12 of a metallic film is formed to cover the signal surface.

Further, an ultraviolet-cured resin is applied on the reflecting layer 12 by means of spin coating to form a protective layer 13 having a predetermined thickness.

The reference number 14 denotes another light-transmitting disc substrate molded out of a synthetic resin. These two disc substrates 11,14 are bonded together with an adhesive layer 15 such as of a hot melt adhesive to constitute a laminated optical disc.

In the laminated optical disc having the constitution described above, a light beam is irradiated upon the signal surface through the disc substrate 11 to reproduce the recorded information by the reflected light.

Further, a paper label 16 having contents of recorded matters printed thereon is applied to the disc substrate 14 on the side opposite to the bonding side on the inner non-recorded area present around the center hole thereof.

However, in the above-described constitution where a paper label is applied to the inner non-recorded area of the laminated optical disc so as to display the contents of recorded matters, it will be difficult to display the contents sufficiently in a disc having a small diameter. Therefore, in order to secure a sufficient display portion, it can be contrived, for example in a single side-recorded laminated optical disc, to display such information by means of printing on the disc substrate having no signal recorded surface. If offset printing is employed, a white ink is first applied entirely over the surface of that disc substrate to a thickness of about 10 μm, and then three primary color inks and a black ink are applied to a thickness of about 5 μm, so that the disc substrate is warped by curing and shrinkage of the inks to provide deteriorated characteristics.

The present invention is accomplished in view of the circumstances described above, and it is an objective of the present invention to provide a laminated optical disc which has a sufficient display portion and can permit a reliable print display.

SUMMARY OF THE INVENTION

The present invention is accomplished for the purpose of solving the problems described above. A laminated optical disc set forth in the appended claim 1, which is formed by bonding together a first disc substrate and a second disc substrate both molded out of a synthetic resin by an adhesive layer to oppose each other and has pits carrying information which is recorded thereon and can be reproduced through the first disc substrate, is characterized in that the second disc substrate is colored and that the side opposite to the bonding side has a print display of contents recorded therein.

A laminated optical disc set forth in the appended claim 2 is characterized in that the second disc substrate is of a planar plate and that the first disc substrate has a first signal recorded surface on the bonding side thereof.

A laminated optical disc set forth in the appended claim 3 is characterized in that the first disc substrate has a semi-transmitting first signal recorded surface on the bonding side thereof, that the second disc substrate has a second signal recorded surface on the bonding side thereof, and that the adhesive layer has light-transmitting properties.

A laminated optical disc set forth in the appended claim 4 is characterized in that the second disc substrate is colored white and that the contents of recorded matters are displayed by means of offset printing.

The present invention can provide a laminated optical disc, which is formed by bonding together the first and second disc substrates molded out of a synthetic resin with an adhesive layer to oppose each other and has pits carrying information which is recorded therein and can be reproduced through the first disc substrate, can secure a sufficient display portion and also permits reliable print display since the second disc substrate is colored and the side opposite to the bonding side thereof displays contents of recorded matters by printing.

DETAILED DESCRIPTION OF THE PREFERRED EMBODIMENTS

Figure 1:
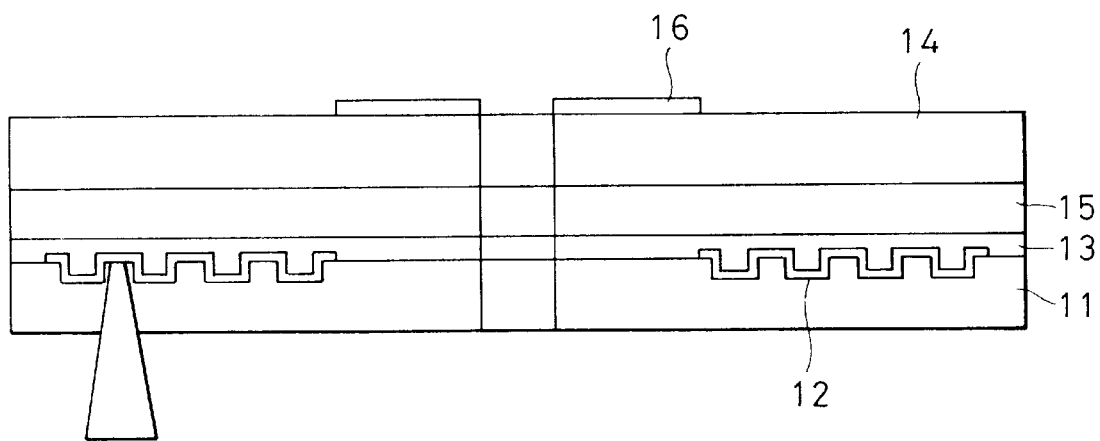
FIG. 1 shows a cross-sectional view of a prior art laminated optical disc.
Figure 2:
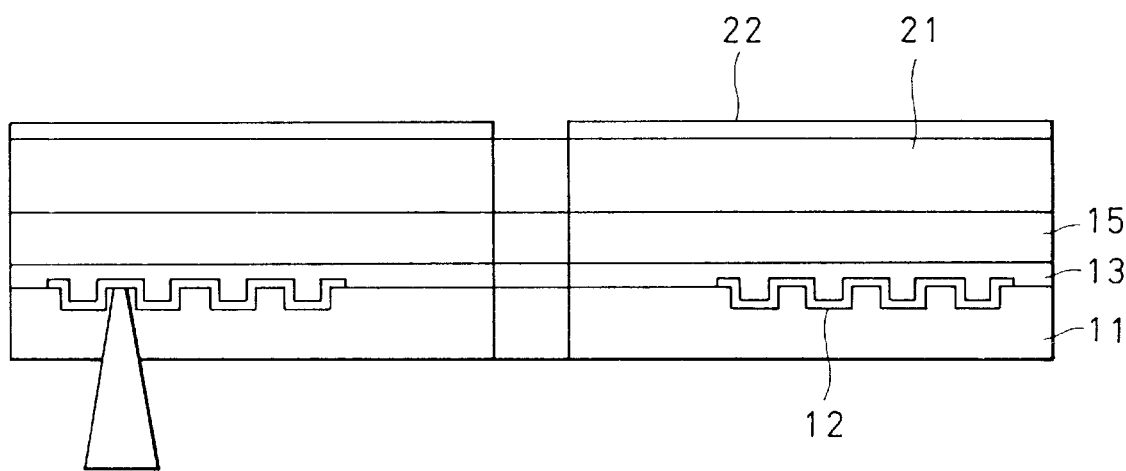
FIG. 2 shows a cross-sectional view of a laminated optical disc according to a first embodiment of the present invention.

FIG. 2 is a cross-sectional view of a one-side recorded laminated optical disc according to a first embodiment of the present invention. It should be noted here that parts similar to those in the prior art are affixed with the same reference numbers respectively.

In FIG. 2, a first disc substrate 11 is a light-transmitting substrate molded out of a synthetic resin such as a polycarbonate and an acrylic resin having a diameter of, for example, 120 mm (70 to 120 mm) and a thickness of about 0.6 mm (0.4 to 0.8 mm) and has on one side a first signal recorded surface having pits carrying signals formed thereon, with a reflecting layer 12 of a metallic film being formed on the first signal recorded surface. Further, a protective layer 13 having a predetermined thickness is formed on the reflecting layer 12 by applying an ultraviolet-cured resin by means of spin coating.

The reference number 21 denotes a second disc substrate to be employed as mechanical reinforcement for the first disc substrate 11. This disc substrate 21 is molded out of a synthetic resin admixed with a pigment or a coating material and is a colored planar plate-like substrate colored, for example, white having a thickness of, for example, 0.6 mm. These two disc substrates 11,21 are bonded together with an adhesive layer 15 formed by applying an ultraviolet-curing adhesive, a hot melt adhesive, etc. to constitute a laminated optical disc.

In the laminated optical disc having the above-described constitution, a light beam is focused on the signal recorded surface through the disc substrate 11 to reproduce information recorded therein by the reflected light.

Further, a print display layer 22 having a thickness of about 5 µm for displaying information on the contents of recorded matters by means of offset printing using three primary color inks and a black ink is formed on the disc substrate 21 on the side opposite to the bonding side.

Figure 3:
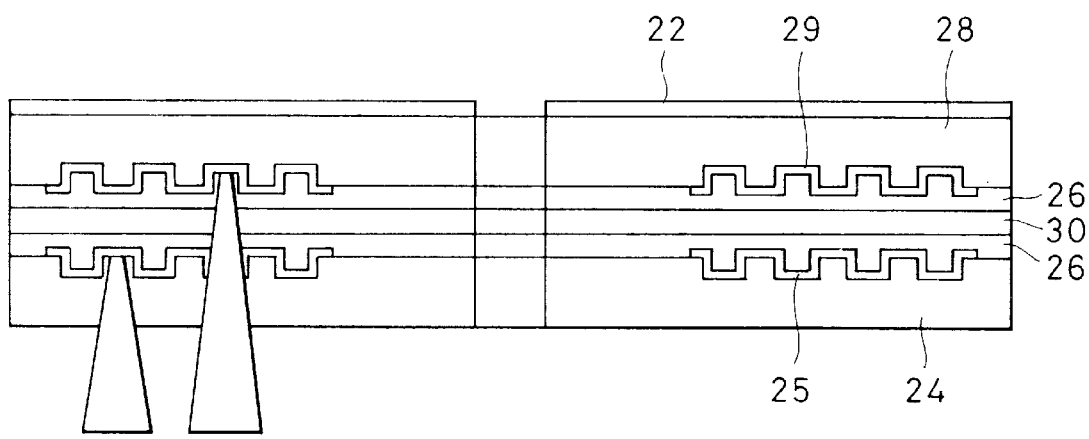
FIG. 3 shows a cross-sectional view of a laminated optical disc according to a second embodiment of the present invention.

FIG. 3 is a cross-sectional view of a double side-recorded laminated optical disc according to a second embodiment of the present invention.

In FIG. 3, a first disc substrate 24 is a light-transmitting substrate molded out of a synthetic resin such as a polycarbonate and an acrylic resin having a diameter of, for example, 120 mm and a thickness of, for example, 0.6 mm and has on one side a first signal recorded surface having pits carrying information formed thereon, with a reflecting layer 25 such as of a translucent metallic film, which partly reflects an incident light and partly transmit it, being formed to cover the first signal recorded surface. Further, a light-transmitting protective layer 26 such as of an ultraviolet-curing resin is formed on this reflecting layer 25.

Meanwhile, the reference number 28 denotes a second disc substrate, which is a colored substrate molded out of a synthetic resin admixed with a pigment or a coating material, colored, for example, white having a thickness of, for example, 0.6 mm. The second disc substrate 28 has on one side a second signal recorded surface having pits carrying information formed thereon, and a reflecting layer 29 of a metallic film having high reflecting properties is formed to cover the second single recorded surface. Further, a light-transmitting protective layer 26 such as of an ultraviolet-cured resin is formed on the reflecting layer 29. Further, a print display layer 22 is formed by applying three primary color inks and a black ink on the second disc substrate 28 by means of offset printing on the side opposite to the bonding side to a thickness of about 5 µm.

These two discs, i.e. the first disc substrate 24 and the protective layer 26 of the second disc substrate 28, are opposed each other to be bonded together with a light-transmitting adhesive layer 30 such as of an ultraviolet-cured adhesive to constitute a laminated optical disc.

In the laminated optical disc having the above-described constitution, a light beam is focused on the first or second signal recorded surface through the first disc substrate 24 to reproduce information recorded thereon by the reflected light.

As described above, in the laminated optical disc according to the present invention, the ground print layer (white print layer having a thickness of about 10 µm required in offset printing) becomes unnecessary by coloring one of the disc substrates, so that only the print display layer having a thickness of about 5 µm may be formed using three primary color inks and a black ink, thus enabling reduction of influences to be caused by shrinkage of the inks and prevention of deformation or warping of the disc.

It should be noted here that, while a protective layer is incorporated in any of the foregoing embodiments, the protective layer may be omitted and two disc substrates may be bonded together directly with the adhesive layer.

As described above, the laminated optical disc provided according to the present invention is formed by laminating together the first and second disc substrates molded out of a synthetic resin with the adhesive layer to oppose each other and has pits carrying information which is recorded therein and can be reproduced through the first disc substrate, can secure a sufficient display portion and also permits formation of reliable print display, since the second disc substrate is colored and the contents of recorded matters are adapted to be displayed by printing on the surface of the colored second disc substrate.

Although only two preferred embodiments of the present invention have been described herein, it should be apparent to those skilled in the art that the present invention may be embodied in many other specific forms without departing from the spirit or scope of the invention.

What is claimed is:

1. A laminated optical disc comprising:

a first disc substrate molded out of a light-transmitting synthetic resin with a thickness in a range of from 0.4 to 8 mm and having a first signal recorded on its one surface including pits;

a second disc substrate molded out of a synthetic resin and having substantially a same thickness as the first disc substrate; and an adhesive layer for bonding the first disc substrate to the second disc substrate with an information recording surface facing inward so that information recorded therein can be read with a light beam passing through the first disc substrate, wherein the second disc substrate is colored and has a display printed on a side opposite a bonded side.

2. The laminated optical disc according to claim 1, wherein the second disc substrate is a planar plate, and wherein the first disc substrate has a first signal recorded surface on the bonded side.

3. The laminated optical disc according to claim 1, wherein the first disc substrate has a semi-transmitting first signal recorded surface on the bonded side, the second disc substrate has a second signal recorded surface on the bonded side, and the adhesive layer transmits light.

4. The laminated optical disc according to any of claims 1 to 3, wherein the second disc substrate is white, and wherein the display is formed using offset printing.

* * * * *